June 17, 1952     I. I. SIKORSKY     2,600,930
HELICOPTER CONTROL

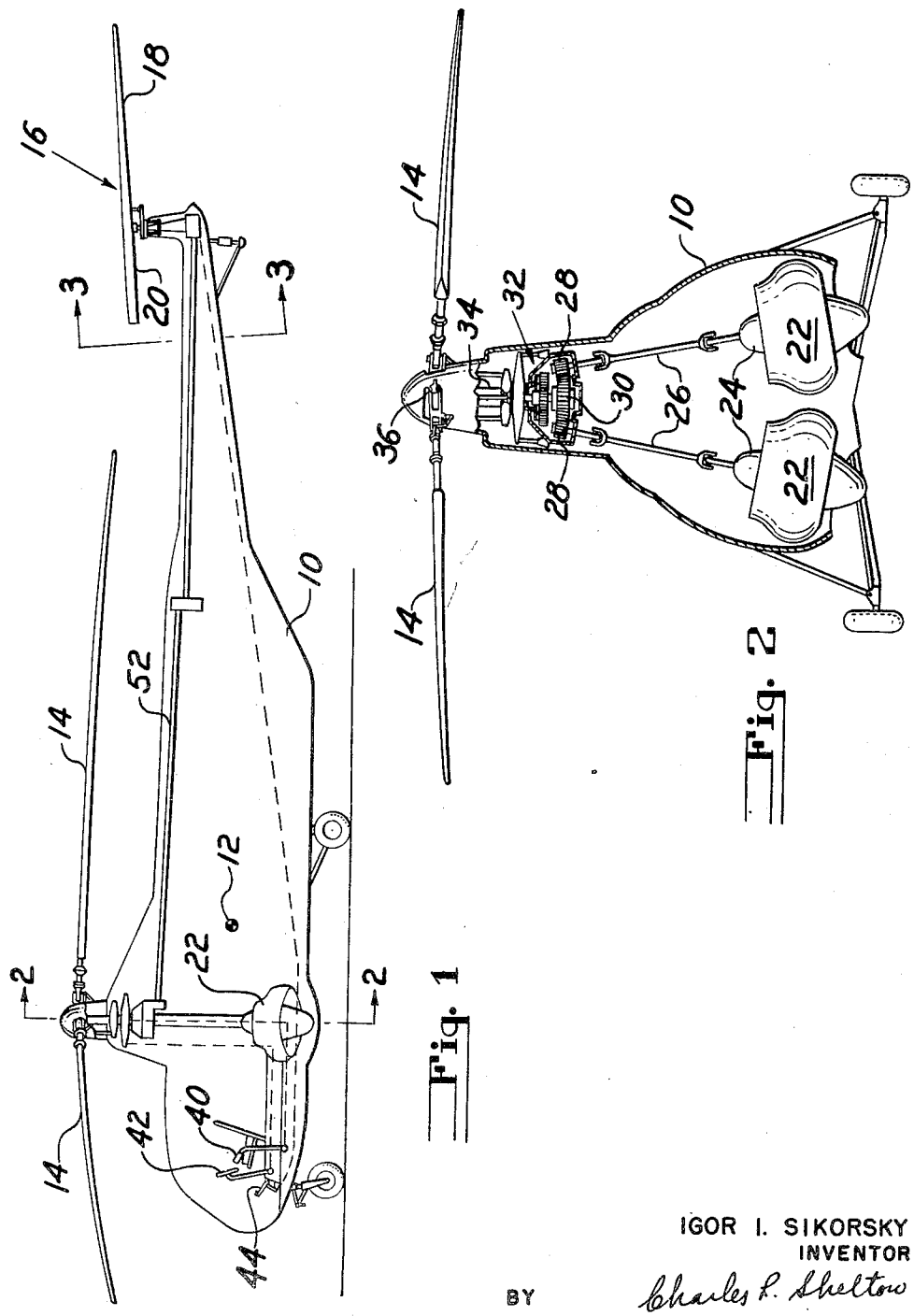

Filed Sept. 24, 1946     4 Sheets-Sheet 2

IGOR I. SIKORSKY
INVENTOR

BY Charles L. Shelton

ATTORNEY

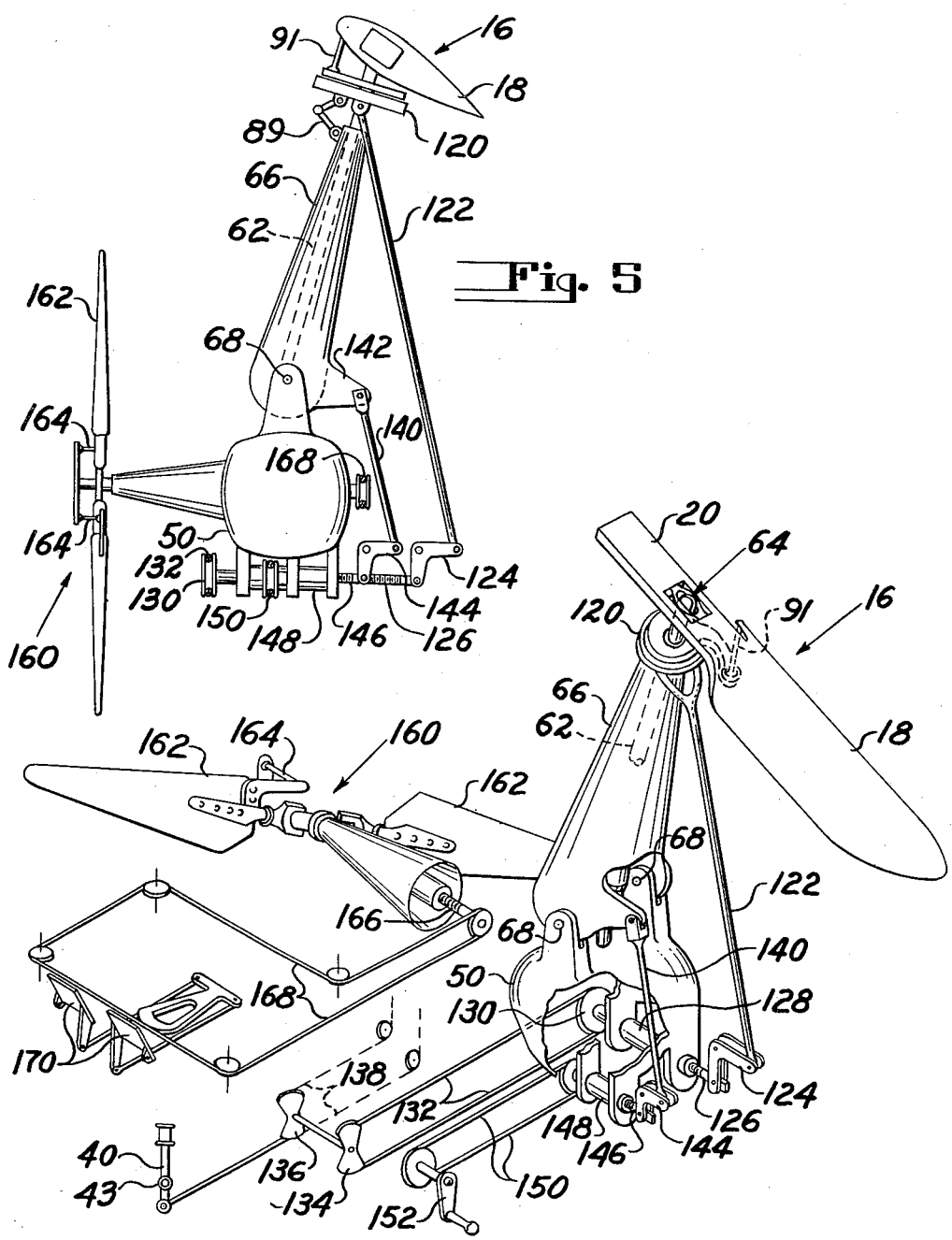

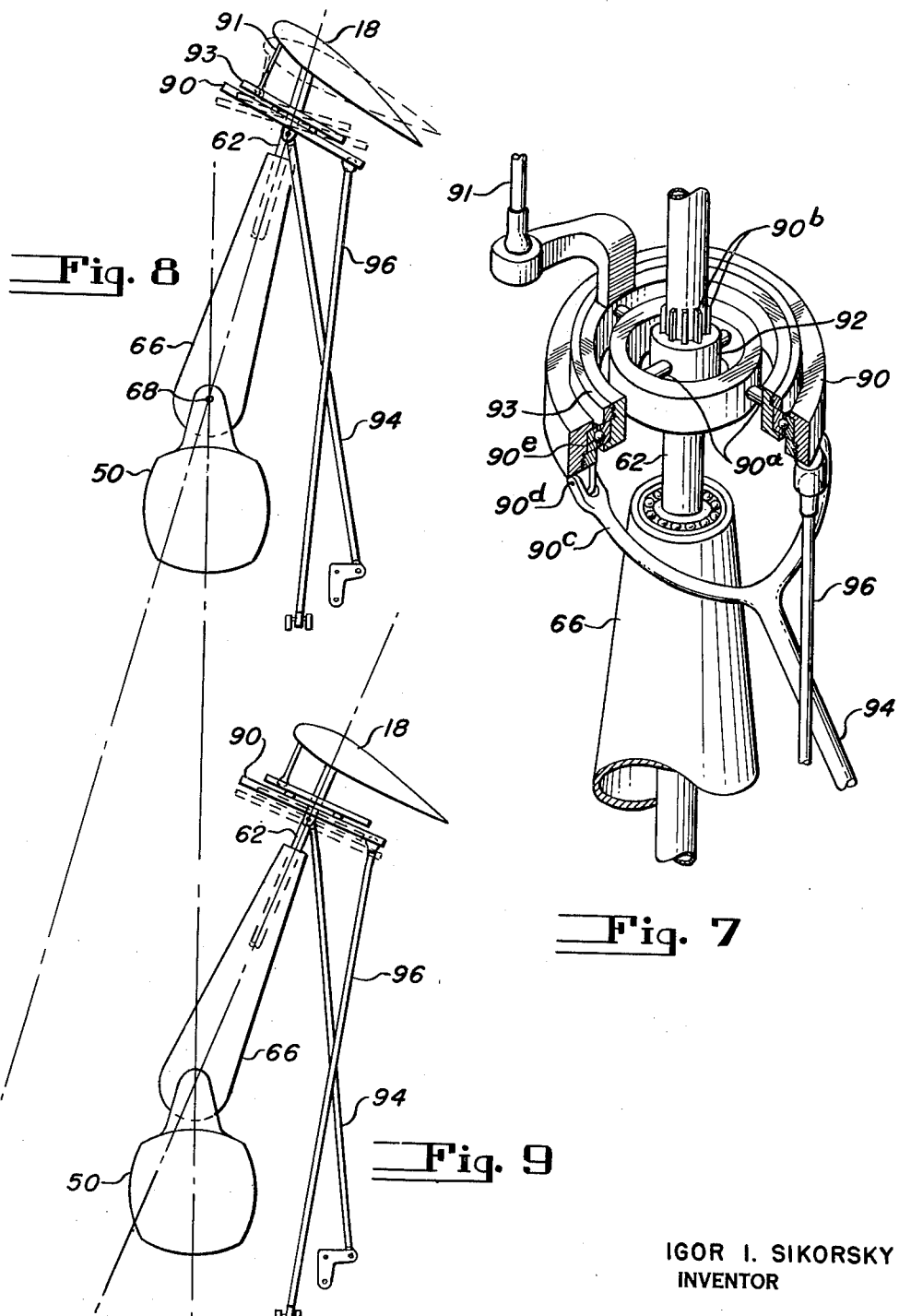

Patented June 17, 1952

2,600,930

UNITED STATES PATENT OFFICE 2,600,930

HELICOPTER CONTROL

Igor I. Sikorsky, Bridgeport, Conn., assignor to United Aircraft Corporation, East Hartford, Conn., a corporation of Delaware Application September 24, 1946, Serial No. 698,947

14 Claims. (Cl. 170—135.24)

This invention relates generally to large sized or cargo helicopters, and more particularly to improved empennage or tail structure including mechanism for assuming a portion of the total lifting load of the helicopter while retaining the function of counterbalancing the torque of the sustaining or main rotor.

The specific features of this invention include structure for tilting the tail rotor to control the heading of the helicopter and to counterbalance different amounts of main rotor torque, while maintaining a predetermined lift component of thrust of the tail rotor, the arrangement of the tail rotor with respect to the empennage portion of the helicopter and the main rotor, and the different parts whereby advantages to be set forth below are attained.

It has been found in helicopters that a rotor will produce a thrust having useful components in at least two directions. For example, the thrust of the main rotor of helicopters when tilted with respect to the horizon will provide both lift and a horizontal component of lift which may be used for propulsion of the aircraft in the direction of the tilt. If the weight of the helicopter which must be supported in flight by the rotor is of the order of 5000 pounds, the vertical component of the rotor thrust must be equal to this value in order to maintain level flight. By inclining the rotor through small angles in the region of 10° or 15° it is possible to obtain an apparently large propulsive component of thrust in the horizontal plane without a proportional increase in the power expended. If the total thrust vector is tilted 12° by an inclination of the plane of the rotor the vertical component of lift is reduced (by the cosine of the angle 12°) to only 97.8% of its original value, or about 4900 pounds, while the horizontal component available for propulsion is of the order of 21% of the total thrust (by the sine of the angle 12°) or about 1040 pounds. Thus, a large propulsion force is available within predetermined limits for only a slight increase of power to maintain level flight.

Accordingly, to obtain generally similar advantages in a helicopter having one main rotor and a smaller tail rotor, I arrange the tail rotor in the present invention to operate normally in an inclined plane with respect to vertical and horizontal planes passing through the body of the helicopter, and make use of the vertical component of thrust of the inclined plane of rotation of the tail rotor to obtain lift to assume a portion of the lift load normally assumed wholly by the main rotor. The tilt in this plane of rotation may be varied more or less from this inclined plane to provide for variations in main rotor torque as well as provide for control of the helicopter.

Accordingly it is an object of this invention to provide a more efficient tail rotor structure by which the power lost in counteracting the main rotor torque is reduced to a minimum.

Another object of this invention is to provide improved structure for compensating variable torque of the sustaining rotor of a helicopter by controlling the plane of rotation of the tail rotor thereof.

A further object is to provide an improved tail rotor wherein, as the tail rotor is tilted, either the vertical or the horizontal component of thrust exerted by the rotor is maintained within predetermined limits.

A further object is to provide a torque compensating tail rotor in a helicopter with cyclic control means operable so that the force exerted by the tail rotor acts to rotate the plane of rotation of the tail rotor under the control of the operator of the craft to position for providing for main rotor torque counterbalance.

Other objects and advantages reside in the provision of a helicopter having a plurality of engines for operating the sustaining and a semi-sustaining tail rotor, and the combination in the engine arrangement of improved driving means together with means for driving the tail rotor, and in the details of construction of the helicopter and particularly of the torque compensating rotor, and will be either obvious or pointed out in the following specification and claims.

In the drawings,

Fig. 1 is a side elevational diagrammatic view embodying one form of my invention;

Fig. 2 is a sectional view taken substantially along the lines 2—2 of Fig. 1;

Figs. 5 and 6 are views similar to Figs. 3 and 4, but showing a modification of the invention whereby an auxiliary rotor is used in combination with a tiltable torque compensation rotor;

Fig. 7 is a detail view showing the gimbal mounting for the torque compensating rotor; and Figs. 8 and 9 are diagrammatic views illustrating the operation of the form of the invention shown in Figs. 1 to 4.

Figure 3:
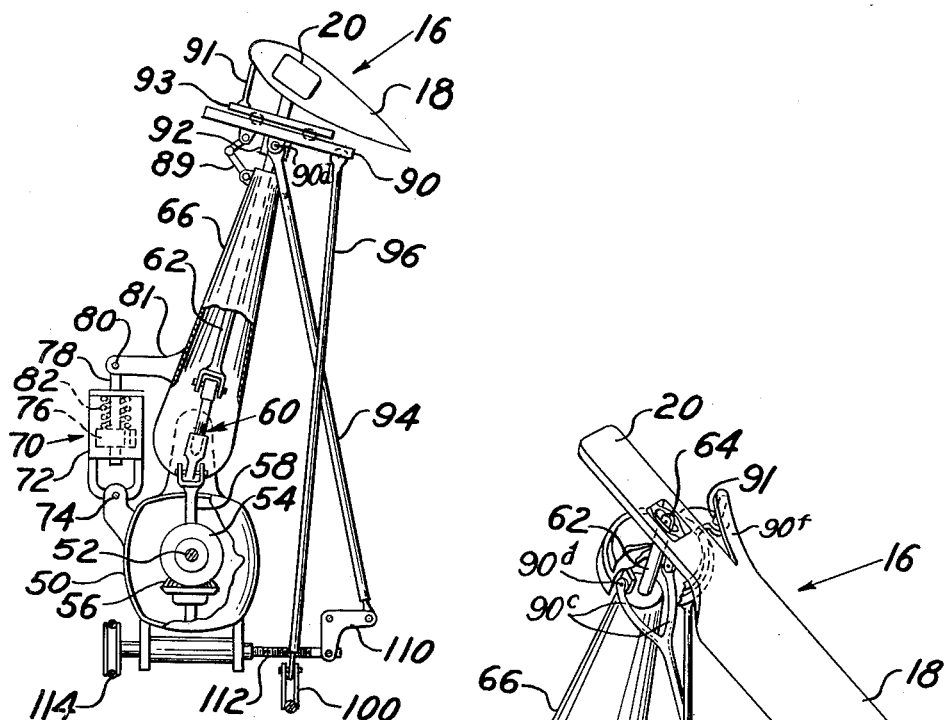
Fig. 3 is a partial view showing certain parts in elevation and certain parts in section of one form of the torque compensating rotor, and taken on the lines 3—3 of Fig. 1.

Referring more in detail to the drawings, in Fig. 1 the helicopter body 10 has a large cargo space amidships and is constructed in such a manner that its center of gravity will occur at approximately the point 12, so that the main rotor blades 14 and tail rotor blade 18 will each assume a portion of the lifting load. The main rotor blades may be of any number, but for purposes of simplicity, to confine the number of parts to a minimum, I prefer to employ three main rotor blades 14. The tail rotor comprises a single blade 16 having a blade portion 18 and a counterweight portion 20. Of course, more blades can be provided if desired or required. The plane of rotation of the blade 16 may be permanently tilted forwardly so that, in forward flight, the drag of the tail rotor is at a minimum. The single blade 16 is synchronized and driven with the main rotor blades 14 in such a manner that with a three bladed main rotor, the tail rotor 16 will make three revolutions for each revolution of the main rotor. With such a geared arrangement, the single blade portion 18 can be at its rearmost position when any of the three blades 14 are in their rearmost position, and thereby the interference between the main rotor and the tail rotor will be kept substantially at a minimum. Of course it is to be understood that with more rotor blades on either the main or tail rotor, other spacings and revolution relationships may be more advantageous or economical.

The main and tail rotors are driven by a pair of engines 22 of similar construction and power which turn overrunning clutches 24 and driveshafts 26. The driveshafts 26 turn pinions 28 which may turn a main pinion 30 of planetary gearing generally indicated by reference character 32. The planetary gearing may turn a shaft 34 which rotates a hub 36 mounting the rotor blades 14 upon suitable hinges and pivots so that stresses in the blades will be kept at a minimum and the blades can be feathered to control their function. For details of construction of a helicopter incorporating such controls, reference may be had to application Serial No. 592,862, entitled, "Helicopter," filed May 9, 1945, of I. I. Sikorsky, now Patent No. 2,517,509, issued August 1, 1950. The blades 14 may be controlled in total pitch by a pitch control arm 40 located in the pilot's compartment of the helicopter, the cyclic pitch of the blades 14 may be controlled by a conventional control wheel 42 operable both fore and aft and laterally, and the plane of rotation of the tail rotor 16 and of the pitch of the blade portion 18 may be controlled by foot pedals 44 in one modification of this invention, and conjointly with the azimuth control 42 and with a trimming adjustment as required, all as will appear below in connection with the description of the other figures of the drawings.

Figure 4:
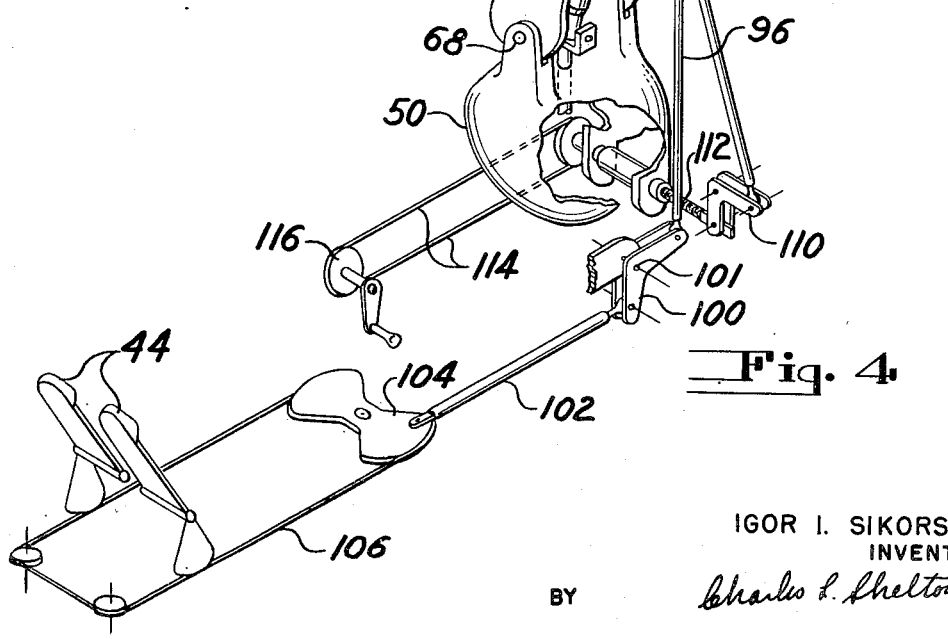
Fig. 4 is a perspective view partly diagrammatic, with parts broken away and showing the structure of Fig. 3.

Figs. 3, 4, 7, 8 and 9 pertain to one modification of this invention wherein both the total pitch and cyclic pitch of the tail rotor 16 is obtained through the use of substantially conventional controls in the pilot's compartment. A portion of the tail cone of the body 10 is shown at 50. A tail rotor driveshaft 52 extends back from the gearing 32 and turns a pinion 54 suitably mounted in bearings in the tail portion 50. The pinion 54 drives a bevel gear 56 to turn a shaft 58. A constant speed universal gear 60 may be of that kind shown and described in the copending application Serial No. 612,899, entitled, "Constant Speed Drive," filed August 27, 1945, of C. P. Heintze, now Patent No. 2,496,624 issued February 7, 1950. The drive shaft 58 turns the constant speed universal 60 which turns the shaft 62 upon which the blade 18 is mounted by a gimbal 64 (Fig. 4). The shaft 62 is journalled in a tiltable cone 66 which is mounted upon a pair of pivots 68 to permit tilting of the plane of rotation of the rotor 16 transversely around the longitudinal axis of the helicopter. Excessive tilting or vibration in the tail rotor 16 is prevented by a damper 70 comprising a cylinder 72 mounted in a pivot 74 connected to the tail portion 50 and a piston 76 connected with a shaft 78 pivotally mounted at 80 upon an ear 81 connected to the tiltable cone 66. The piston 76 may be spring biased as by a spring 82 which acts in a direction to straighten the cone 66 upwardly with respect to the body of the helicopter so that when no torque is applied to the tail rotor 16, it will straighten up into the position shown in Fig. 1 to clear objects upon the ground and also to improve the appearance of the craft when it is at rest. The tail rotor 16 is adapted to be tilted laterally by a cyclic pitch control plate 90 that is held against rotation by a scissors 89 (Fig. 3). Plate 90 is supported by gimbals $90^a$ on a sleeve 92 which is slidable on splines $90^b$ up and down on shaft 62 by a total pitch control rod 94. The upper end of rod 94 terminates in a yoke $90^c$ having its ends pivoted at diametrically opposite points $90^d$ to plate 90. The gimbals $90^a$ have an outer annular member, or plate, 93 which is mounted on bearings $90^e$ on nonrotatable plate 90. This construction permits plate 93 to rotate with respect to nonrotatable plate 90 while also moving in response to the up and down and lateral tilting movements of plate 90 by total pitch control rod 94 and cyclic pitch control rod 96 respectively. These movements of plates 90 and 93 are transmitted to the blade portion 18 through a connection 91 between plate 93 and an arm $90^f$ (Fig. 4) on the blade portion 18 which is offset from the pitch changing axis of the blade. When the plate 90 is tilted, the pitch of the blade portion 18 will change cyclically to cause a horizontal component of thrust to be exerted upon the driving shaft 62 and cone 66 to cause the latter to rotate around the pivots 68. Such rotation will not be instantaneous, but will be damped by the damper 70 to prevent hunting and vibration of the tail rotor 16 when it is in an adjusted position, in which position there is no transverse moment of thrust exerted on shaft 62. In order to cyclically change the pitch, the rod 96 may be moved up or down by a bell crank 100 which has its midpivot point 101 secured to the body of the helicopter and is moved by a push pull rod 102. The push pull rod 102 is pivotally connected to a plate 104 also secured to the body of the helicopter, which plate connects by a cable 106 with the pedals 44 in the pilot's compartment of the helicopter. As these pedals are moved differentially, the rod 102 will move back and forth to move the rod 96 up and down to cause lateral tilting of the tilt plate 90 and hence the cyclical pitch variation for the blade portion 18. The resultant transverse thrust may change either the heading of the craft or the capacity of the tail rotor 16 for counterbalancing main rotor torque.

When the helicopter is on the ground and the main and tail rotor blades 14 and 18 are stationary, the cone 66 will be in an upright position under the influence of spring 82 in which it lies in the vertical plane including the longitudinal axis of the helicopter. As the rotor blades are rotated, in order to counteract the torque of the main rotor, the operator through the operation of pedals 44 pulls the cyclic pitch control rod 96 downwardly to tilt the plate 90 and the plate 93 carried thereby laterally and through the connection 91 cyclically changes the pitch of the tail rotor blade 18. This pitch changing movement of the blade 18 about its longitudinal spar axis requires very little force and hence the tilting of the plate 90 by the rod 96 requires very little force as compared with the force required to move the cone 66 against the action of spring 82. Accordingly the downward pull of rod 96 first results in changing the pitch of the blade 18 without moving the cone 66 about its pivots 68. As a result of this cyclic pitch imposed upon the blade 18, a lateral thrust is created, far greater than the force required to change the pitch of blade 18, which tilts the cone 66 in the direction shown in Fig. 3.

Due to the fact that the connection of the upper end of the cyclic pitch control rod 96 to the swash plate 90 remains a fixed distance from the fuselage during the tilting of the cone 66 shown, the previously tilted swash plate 90 will be reversely tilted laterally until it is again at right angles to the shaft 62 which constitutes the axis of the cone 66. It will thus be evident that this mechanism acts as a servo-mechanism in which a relatively light force applied to the rod 96 is used to effect a cyclic pitch change in the blade 18 which, as a result of the aerodynamic force acting thereon, applies a far greater force sufficient to tilt the cone 66. Also it will be evident that the mechanism above described has a follow-up function in that the tilting of the cone again adjusts the tilt of the swash plate 90 to bring the blade into its original position relative to the axis of the cone in the new tilted position of the latter in which position there is no transverse moment of thrust on the shaft 62.

It will be noted that the tilting of the swash plate 90 by rod 96 does not cause movement of sleeve 92 along shaft 62 since pivots 90ᵈ for yoke 90ᶜ lie in a diameter of shaft 62. However, due to the fact that the lower end of total pitch control rod 94 is held fixed, and by reason of the particular location of the pivots of the rods 94 and 96 and the pivot 68 for the cone 66, the lateral tilting of cone 66 toward the right (Fig. 3) results in movement of the sleeve 92 upwardly on the shaft 62 to effect an increase in the total pitch of the blade 18 an amount to maintain the vertical component of thrust of the tail rotor substantially constant during the above described variation in its lateral component of thrust.

The above operation is illustrated somewhat diagrammatically in Figs. 8 and 9. In Fig. 8 the cone 66 is shown inclined into a position such as it might occupy when the helicopter is on the ground with the rotors turning. The position of the tail rotor blade 18 and the tiltable swash plate 90, 93 for this position of the cone 66 is shown in dotted lines. It will be noted that in this original dotted position the swash plate 90, 93 is at right angles to the axis of cone 66. The swash plate is shown in full lines in a further tilted position relative to shaft 62 due to downward actuation of lateral cyclic pitch control rod 96.

In Fig. 9 the cone 66 is shown in a further inclined position due to the increased lateral thrust resulting from this increased tilt of the swash plate. Fig. 9 also shows that the swash plate has automatically returned to its right angle relationship to shaft 62 and has moved upwardly on shaft 62 to slightly increase the total pitch of blade 18, the dotted line position of swash plate 90 indicating the original position of this plate prior to the operation of control rod 96 indicated by full lines in Fig. 8.

It will be evident that a still further lateral thrust on the body of the helicopter for the purpose, for example, of changing the direction of flight of the helicopter can be effected by further pulling down the cyclic pitch rod 96 to repeat the above operation of the mechanism.

The present structure can be trimmed by changing the control point of the cyclic pitch mechanism by moving the rod 94 which changes the total pitch of the tail rotor 16. The rod 94 may be moved up and down by a bell crank 110 actuated conveniently by a worm 112 turned by a cable 114 connected with a hand wheel 116 in the pilot's compartment of the helicopter. When the hand wheel 116 is turned, the worm 112 may be moved in or out to rock the bell crank 110 to raise or lower the rod 94. The rod 94 will raise the sleeve 92 to raise the connection 91 controlling the average pitch of the blade portion 18 so that during its entire revolution, the blade portion 18 will exert greater lift. This latter mechanism may be brought into use where the load of the helicopter is somewhat more rearward than the normal center of gravity 12, so that the ship will fly substantially upon an even keel. Of course, if the center of gravity lies ahead of the normal center of gravity 12, the pitch of the blade portion 18 may be reduced.

In that form of my invention shown in Figs. 5 and 6, I employ a pitch control stick for controlling the total pitch of the tail rotor of the helicopter and of the main rotor if required, and use foot pedals for controlling the pitch of a second tail rotor turnable upon a horizontal shaft and variable in pitch for manoeuvring the craft. Certain of the details of construction are identical with those described in Figs. 3 and 4 and similar reference characters have been applied to similar parts in Figs. 5 and 6. A total pitch control plate 120 is moved up and down by a control rod 122. The non-rotatable control plate 120 in this modification does not tilt but merely moves the rotatable upper plate and the connecting rod 91 up and down to change the pitch of the blade portion 18 and may be journalled slideably on the drive shaft 62. The rod 122 is connected by a bell crank 124 to a worm 126 suitably retained in a worm drive 128 turned by a pulley 130 under the control of cables 132. The cables 132 are connected with an arcuate segment 134 that turns with a segment 136 that may control pitch cables 138 for the main rotor blades 14. The control stick 40 may be turned upon a pivot 43 to rock the segments 136 and 134 together to change the total pitch of the main rotor blades and also to move cables 132 to turn the worm drive 128 to move the worm 126 in or out as the sense of movement may be. Movement of the worm 126 will cause an up and down movement of the rod 122 which will move the plate 120 up or down to change the pitch of the blade portion 18.

In order to trim this modification of the invention for lift and torque requirements, I provide means for tilting the tail support 66. A rod 140 is pivoted to an ear 142 on the cone 66.

The lower end of the rod 140 is pivotally connected to a bell crank 144 which has its mid-pivot secured to the housing. A worm 146 connects with a worm drive 148 turned by a cable 150. The cable 150 connects with a crank 152 located in the pilot's compartment of the helicopter. When the crank 152 is turned, the worm 146 may be moved in or out to rock the bell crank 144 and raise or lower the rod 140 to tilt the cone 66. Tilting of the cone 66 will have substantially the same result as explained in connection with Figs. 3 and 4 to vary the horizontal component of thrust of the tail rotor 16.

The total pitch rod 122 is so arranged with respect to the total pitch control means and the pivot 68 for the tail cone 66 that rotation of the tail cone upon said pivot will cause the rod 122 to move with respect to the drive shaft 62. This will result in an automatic change of pitch upon change of plane of rotation of the tail rotor 16. By properly placing the pivot points for the lower end of the rod 122 and the pivot 68 for the tail cone 66, the amount of change of pitch can be made substantially to maintain a uniform or constant vertical component of lift even though the horizontal component of lift is varied. Conversely, it is possible with this structure to maintain a constant lateral component of thrust while maintaining a variable vertical component of thrust, or lift, and it may prove advantageous in different ships for trimming purposes if the trim connection is made through such a linkage particularly where the ships may be large in size and hence require a large amount of trimming for accommodating cargoes of different weights and shape and hence variations through rather a large range in the location of the center of gravity 12 with relationship to the body 10 of the helicopter.

Lateral control may be used in connection with this invention and obtained by means of an auxiliary lateral thrust rotor 160 located adjacent the tail rotor 16. The auxiliary rotor 160 may comprise one or more blades 162 having pitch control connections 164 to a worm 166 to change the pitch of the blades 162. The structure of the tail rotor 160 may be of that kind shown and described in the patent of I. I. Sikorsky mentioned above. The pitch of the blades 162 is controlled by a cable 168 connected with pedals 170 located in the cockpit of the helicopter and operated by the pilot. With this modification, the tail rotor 16 may be trimmed to a given position to assume all of the lift and trim and counterbalance the major portion of the torque of the main rotor, and the auxiliary rotor 160 may be adjusted for manoeuvring and for absorbing a predetermined portion of the main rotor torque, as required.

While I have shown and described in some detail, two specific modifications of my invention, it is to be understood that mechanical equivalents available to one skilled in the art are also comprehended as coming within the scope of this invention. For this reason, I wish not to be limited in my invention only to those embodiments shown and described, but by the scope of the following claims.

I claim:

1. The combination in a helicopter including a body and a power driven sustaining rotor, of a power driven semi-sustaining control rotor pivotally mounted upon and spaced by said body from said sustaining rotor for counterbalancing the torque of said sustaining rotor and for controlling the attitude of the helicopter, said control rotor having a controllable pitch blade cyclic pitch control means for said blade for tilting said control rotor about its pivot and varying the torque counterbalancing effect of said control rotor, and means for maintaining the lift component of thrust of said control rotor substantially constant upon operation of said cyclic pitch control means including total pitch control means for said blade operated in response to the operation of said cyclic pitch control means.

2. The combination in a helicopter including a body and a power driven sustaining rotor, of a power driven control rotor pivotally mounted upon and spaced by said body from said sustaining rotor for counterbalancing the torque of said sustaining rotor and for controlling the attitude of the helicopter, said control rotor having a controllable pitch blade cyclic pitch control means for varying the pitch of said blade cyclically to tilt said control rotor about its pivot and vary the torque counterbalancing effect of said control rotor, means for maintaining the lift component of thrust of said control rotor substantially constant upon operation of said cyclic pitch control means including total pitch control means operated in response to tilting of said control rotor by said cyclic pitch control means, and means for adjusting said total pitch control means independently of said cyclic pitch control means.

3. In a helicopter, an elongated fuselage, a main power driven sustaining rotor mounted at the fore part of said fuselage, an empennage mounted on said fuselage for lateral pivotal movement, a semi-sustaining power driven rotor carried by said empennage including a controllabe pitch blade, means for tilting said empennage including a swash plate mounted on said empennage and having an operative connection to said blade to control its pitch cyclically, and control means carried by said fuselage and operatively connected with said swash plate for tilting the latter to create a lateral component of thrust acting on said empennage to tilt the latter about its pivotal support.

4. In a helicopter, an elongated fuselage, a main power driven sustaining rotor mounted at the fore part of said fuselage, an empennage mounted on said fuselage for lateral pivotal movement, a semi-sustaining power driven rotor carried by said empennage including a controllable pitch blade, means for producing a lateral component of thrust by said blade for tilting said empennage including a swash plate having an operative connection with said blade for varying the pitch of the latter cyclically, and manually operable means carried by said fuselage for tilting said swash plate laterally in the direction in which it is desired to tilt said empennage.

5. In a helicopter, an elongated fuselage, a main power driven sustaining rotor mounted at the fore part of said fuselage, an upstanding empennage pivotally mounted on said fuselage for lateral movement, an auxiliary power driven rotor carried by said empennage including a controllable pitch blade, a swash plate mounted on said empennage and having an operative connection to said blade to control the pitch of the latter cyclically, and control means carried by said fuselage and operatively connected with said swash plate for tilting the latter to impart cyclic pitch control to said blade, said power driven auxiliary rotor comprising a servo motor for tilting said empennage about its pivot in response to a small force manually applied to said control means.

6. In a helicopter, a fuselage, a main lifting rotor, an upstanding tail cone supported on said fuselage for lateral tilting movement about the longitudinal axis of said fuselage, a drive shaft coaxial with said cone, a tail rotor mounted on said drive shaft having a controllable pitch blade, means for tilting said tail cone in response to aerodynamic forces acting on said tail rotor including a swash plate mounted on said cone having connections to said blade for changing the pitch thereof cyclically, manually operable means carried by said fuselage having a connection to said swash plate for tilting the latter, and means for normally biasing said cone toward an upright position.

7. In a helicopter, a fuselage, a main lifting rotor, an upstanding tail cone supported on said fuselage for lateral tilting movement about the longitudinal axis of said fuselage, a drive shaft coaxial with said cone, a tail rotor mounted on said drive shaft having a controllable pitch blade, means for tilting said tail cone in response to aerodynamic forces acting on said tail rotor including a swash plate mounted on said cone having connections to said blade for changing the pitch thereof cyclically, manually operable means carried by said fuselage having a connection to said swash plate for tilting the latter, means for normally biasing said cone toward an upright position, and means connected between said cone and said fuselage for damping the lateral tilting movement of said cone.

8. In a helicopter, an elongated fuselage, a main power driven sustaining rotor mounted at the fore part of said fuselage, an empennage mounted on said fuselage for lateral pivotal movement, a semi-sustaining power driven rotor carried by said empennage including a controllable pitch blade, means for tilting said empennage by the thrust of said blade including a swash plate carried by said empennage having an operative connection with the blade for changing the pitch of the latter cyclically, and manually operable means carried by said fuselage and having an operative connection at one side of said swash plate for tilting the latter, said manually operable means being located at the side of said empennage toward which the latter tilts, whereby tilting of said empennage following operation of said manual control means to cyclically vary the pitch of said blade results in a reverse tilting movement of said swash plate to bring the latter again into a plane perpendicular to the axis of said empennage.

9. In a helicopter, an elongated fuselage, a main power driven sustaining rotor mounted at the fore part of said fuselage, a generally upright empennage mounted on said fuselage for lateral pivotal movement including an axial drive shaft, a semi-sustaining rotor carried by said empennage and driven by said shaft including a controllable pitch blade, means for tilting said empennage by the thrust of said blade including a swash plate carried by said empennage having an operative connection with said blade for changing the pitch of the latter cyclically, and manually operable means carried by said fuselage having an operative connection at one side of said swash plate whereby tilting of said empennage following operation of said manual control means to cyclically vary the pitch of said blade results in a reverse tilting movement of said swash plate relative to said empennage sufficient to bring the latter again into a plane perpendicular to said drive shaft.

10. In a helicopter, an elongated fuselage, a main power driven sustaining rotor mounted at the fore part of said fuselage, an empennage portion mounted on said fuselage for lateral pivotal movement, a semi-sustaining power driven rotor carried by said portion including a controllable pitch blade, manually operable means for tilting said portion to provide a lateral component of thrust of said semi-sustaining rotor including means for varying the pitch of said blade cyclically, and means operative in response to said tilting movement of said portion for varying the total pitch of said blade an amount sufficient to maintain the lift component of thrust of said semi-sustaining rotor substantially constant.

11. In a helicopter, an elongated fuselage, a main power driven sustaining rotor mounted at the fore part of said fuselage, an empennage portion mounted on said fuselage for lateral pivotal movement, a semi-sustaining power driven rotor carried by said portion including a controllable pitch blade, total pitch control means having an operative connection with said blade, means for tilting said portion including means having an operative connection with said blade for imposing a cyclic pitch variation on said blade, and means having an operative connection with said blade and operative in response to said tilting movement for varying the total pitch of said blade an amount sufficient to maintain the lift component of thrust of said semi-sustaining rotor substantially constant.

12. In a helicopter, an elongated body, a main sustaining rotor located at the fore part of said body, an auxiliary sustaining rotor located at the aft part of said body, said auxiliary rotor having a blade mounted for flapping movement about a transverse axis and for pitch changing movement about the longitudinal axis of said blade, said auxiliary rotor being pivotally mounted on said helicopter body for lateral tilting movement, means normally biasing said auxiliary rotor toward an upright position in which it lies substantially in the longitudinal vertical plane of said body, means for tilting said rotor about its pivotal support on said body including a laterally tiltable swash plate having an operative connection with said blade for changing the pitch of the latter cyclically, and manually controlled means having an operative connection to said swash plate for tilting the latter to cyclically vary the pitch of said auxiliary rotor blade and create a lateral component of thrust by the latter, total pitch control means for said auxiliary rotor blade including a manually operable member having a pivotal connection to said body and having an operative connection to said swash plate, said cyclic and total pitch connections to said swash plate being so arranged relative to the axis of pivotal support of said auxiliary rotor that tilting movement of said auxiliary rotor automatically effects movement of said swash plate by said total pitch control an amount sufficient to maintain the sustaining component of thrust of said auxiliary rotor constant during tilting of the latter to provide said lateral component of thrust.

13. In a helicopter, a fuselage, main and auxiliary power driven sustaining rotors at the fore and aft parts of said fuselage respectively, said auxiliary rotor having a controllable pitch blade, means for mounting said auxiliary rotor for lateral tilting movement relative to a fore and aft axis of said fuselage, means having an operative connection with said blade for varying the total pitch of said blade, means for laterally tilting said auxiliary rotor including means operatively connected with said blade for cyclically varying the pitch of said auxiliary rotor blade, and means having an operative connection to said blade and responsive to said tilting movement for actuating said total pitch varying means an amount sufficient to maintain the lift of said auxiliary rotor substantially constant.

14. In a helicopter, a fuselage, main and auxiliary power driven sustaining rotors mounted at the fore and aft parts of said fuselage, said auxiliary rotor having a controllable pitch blade, pivot means mounting said auxiliary rotor for lateral tilting movement, means for tilting said auxiliary rotor by the thrust of said blade including a swash plate carried by said rotor having an operative connection with said blade for changing the pitch of the latter cyclically, and manually operable means carried by said fuselage and having an operative connection to said swash plate for tilting the latter, said manually operable means being located at the side of said rotor toward which the latter tilts, whereby tilting of said auxiliary rotor following operation of said manual control means results in reverse tilting movement of said swash plate to return the latter to its original position.

IGOR I. SIKORSKY.

REFERENCES CITED

The following references are of record in the file of this patent:

UNITED STATES PATENTS

| Number | Name | Date |
| --- | --- | --- |
| 1,409,850 | Haney | Mar. 14, 1922 |
| 1,491,310 | Perrin | Apr. 22, 1924 |
| 1,783,011 | Florine | Nov. 25, 1930 |
| 1,879,323 | Koch | Sept. 27, 1932 |
| 2,023,105 | Smith | Dec. 3, 1935 |
| 2,225,002 | Focke | Dec. 17, 1940 |
| 2,233,747 | Riedl | Mar. 4, 1941 |
| 2,273,303 | Waldron | Feb. 17, 1942 |
| 2,317,341 | Bennett | Apr. 27, 1943 |
| 2,385,889 | Skavinsky | Oct. 2, 1945 |

FOREIGN PATENTS

| Number | Country | Date |
| --- | --- | --- |
| 155,974 | Switzerland | Oct. 1, 1932 |
| 637,938 | France | Feb. 13, 1928 |
| 317,059 | Great Britain | Feb. 9, 1931 |